(12) United States Patent
Oberhardt

(10) Patent No.: US 6,840,037 B2
(45) Date of Patent: Jan. 11, 2005

(54) EXHAUST PULSE CONTROL UNIT

(75) Inventor: Stephen Oberhardt, Virginia (AU)

(73) Assignee: EPU Limited, Brisbane (AU)

(*) Notice: Subject to any disclaimer, the term of this patent is extended or adjusted under 35 U.S.C. 154(b) by 0 days.

(21) Appl. No.: 10/203,678

(22) PCT Filed: Feb. 7, 2001

(86) PCT No.: PCT/AU01/00107

§ 371 (c)(1),
(2), (4) Date: Oct. 10, 2002

(87) PCT Pub. No.: WO01/59274

PCT Pub. Date: Aug. 16, 2001

(65) Prior Publication Data

US 2003/0159437 A1 Aug. 28, 2003

(30) Foreign Application Priority Data

Feb. 14, 2000 (AU) .......................... PQ 5609

(51) Int. Cl.⁷ .............................................. F02B 27/02
(52) U.S. Cl. .............................. 60/312; 60/282; 60/322
(58) Field of Search ........................... 60/312, 313, 314, 60/282, 322, 324

(56) References Cited

U.S. PATENT DOCUMENTS

| 3,434,280 A | 3/1969 | Burkhart | |
| 4,348,862 A | 9/1982 | Fujikawa et al. | |
| 4,531,364 A * | 7/1985 | Equi | 60/314 |
| 5,012,642 A | 5/1991 | Laimbock | |
| 5,050,378 A | 9/1991 | Clemmons | |
| 5,216,883 A * | 6/1993 | Flugger | 60/313 |
| 5,953,909 A * | 9/1999 | Waltrip, III | 60/275 |
| 6,026,641 A * | 2/2000 | Liberty | 60/314 |
| 6,381,956 B1 * | 5/2002 | Gilbertson | 60/312 |

FOREIGN PATENT DOCUMENTS

| AU | 104426 | 3/1926 | |
| DE | 967299 | 10/1957 | |
| DE | 1 9654710 | 7/1998 | |
| JP | 05-156921 | * | 6/1993 |
| JP | 06-042354 | * | 2/1994 |
| WO | WO 9823854 | | 6/1998 |

* cited by examiner

Primary Examiner—Thomas Denion
Assistant Examiner—Diem Tran
(74) Attorney, Agent, or Firm—Ladas & Parry LLP

(57) ABSTRACT

An exhaust pulse control unit (10) for increasing exhaust manifold vacuum in an engine comprises an inlet (11), an outlet (12) and an intermediate containment zone (13). An exhaust pulse capture and expansion zone (14) is located between the inlet and intermediate zone and a merging zone (17) between the intermediate zone and the outlet. The capture and expansion zone may consist of two stages with the first stage providing a relatively rapid increase in exhaust gas volume.

8 Claims, 6 Drawing Sheets

Torque Effort

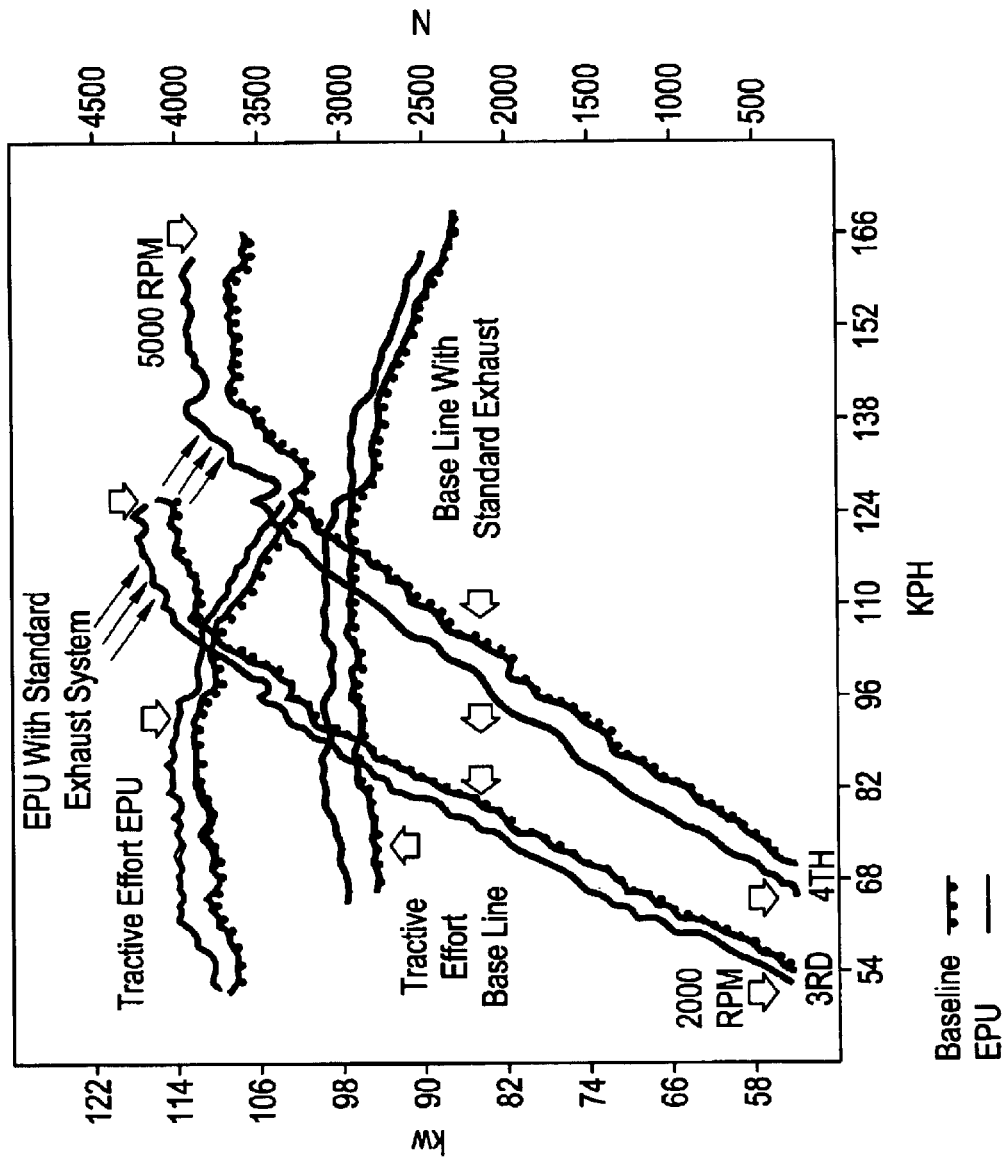

EXHAUST PULSE CONTROL UNIT

This invention relates to an engine exhaust pulse control unit. In particular, the invention relates to an engine exhaust control unit which controls expansion of exhaust gases from an engine to improve engine efficiency.

In internal combustion engines efficient removal or scavenging of exhaust gases is desirable from the point of view of engine efficiency and cleaner burning of fuel to reduce harmful engine emissions.

Patent specification WO98/23854 discloses a device for optimising the efficiency of an internal combustion engine. The device includes either a fixed or movable means arranged to modify the velocity and pressure of gas flow directed towards a cylinder of the engine or through an exhaust pipe for removing exhaust gases from the engine.

When the device is within the exhaust pipe or system its intention is to enable the velocity of spent gas to be increased towards the free air after the first spontaneous exhaust stage, so creating greater vacuum for more efficient engine scavenging.

The device disclosed in its various embodiments in this earlier patent specification appears to function as a baffle which restricts the flow of engine exhaust gases and creates turbulent flow of the gases and does not appear to function as intended.

My co-pending Australian patent application PQ2456 (now lapsed) discloses an engine exhaust control unit for increasing exhaust manifold vacuum in an engine and is an improvement over what is disclosed in WO98/23854.

SUMMARY OF THE INVENTION

It is an object of the present invention to provide an improved exhaust pulse control unit and one which may be used as an alternative to what is disclosed in my co-pending patent application.

According to one aspect the invention provides an exhaust pulse control unit for creating negative pressure exhaust pulses upstream of the unit in a four stroke engine, the unit having a single chamber with an inlet, a separate exhaust pulse expansion and capture zone adjacent the inlet an intermediate containment zone with the capture and expansion zone being adjacent one end of the intermediate zone, an outlet adjacent the other end of the intermediate zone, the outlet having a greater diameter than the inlet and a merging zone between the intermediate zone and the outlet, wherein an atmospheric return pulse interacts with an expanded exhaust pulse in the intermediate zone, without the presence of a muffling effect or muffling device in any of the zones.

The intermediate zone is preferably of constant cross sectional area for the whole of its length. Exhaust gas pulses enter the unit through the inlet and atmospheric pulses enter the unit through the outlet and the exhaust pulses and atmosphering pulses interact within the confines of the intermediate zone.

The intermediate zone may have a length determined by engine characteristics.

The inlet and the outlet are preferably inlet and outlet tubes. It is preferred that the outlet tube be of a diameter greater than the diameter of the inlet tube and the intermediate zone have a greater diameter than the inlet and outlet tubes.

The capture and expansion zone increase the volume of the gas passing from the inlet to the outlet. This increase in volume preferably occurs in two stages. The first stage provides for relatively rapid increase in exhaust gas volume and allows exhaust pulses to expand as they exit from the inlet and progress towards the intermediate zone. The first stage forms a relatively small angle with respect to the inlet. This relatively small angle is smaller than the angle that the second stage forms with respect to the inlet.

Preferably the first stage extends at an angle of between 40° to 50° relative to a longitudinal axis through the inlet whilst the second stage extends at an angle between 60° and 80°. Preferably the first stage extends at an angle of 45° whilst the second stage extends at an angle of 60°.

The exhaust gas pulses are caused to expand rapidly in volume as they pass from the inlet and into the first stage of the capture and expansion zone. Further but rapid expansion occurs in the second stage. This causes a boundary layer in the exhaust pulse to expand but a central portion of the exhaust pulse is not subjected to appreciable expansion in the second stage. This maintains pulse momentum of the pulses as they travel along the intermediate zone.

The merging zone is present to ensure that back pressure is created to provide for effective scavenging of exhaust from the engine to which the unit of the invention is fitted.

The merging zone extends at an angle with respect to a longitudinal axis through the outlet. Preferably the angle is between 40° and 50°. An angle of 45° is preferred.

BRIEF DESCRIPTION OF THE DRAWINGS

A preferred embodiment of the invention will now be described by way of example with reference to the drawings.

FIG. 6 is a graph of power and torque test results.

DETAILED DESCRIPTION OF THE PREFERRED EMBODIMENT

Figure 1:
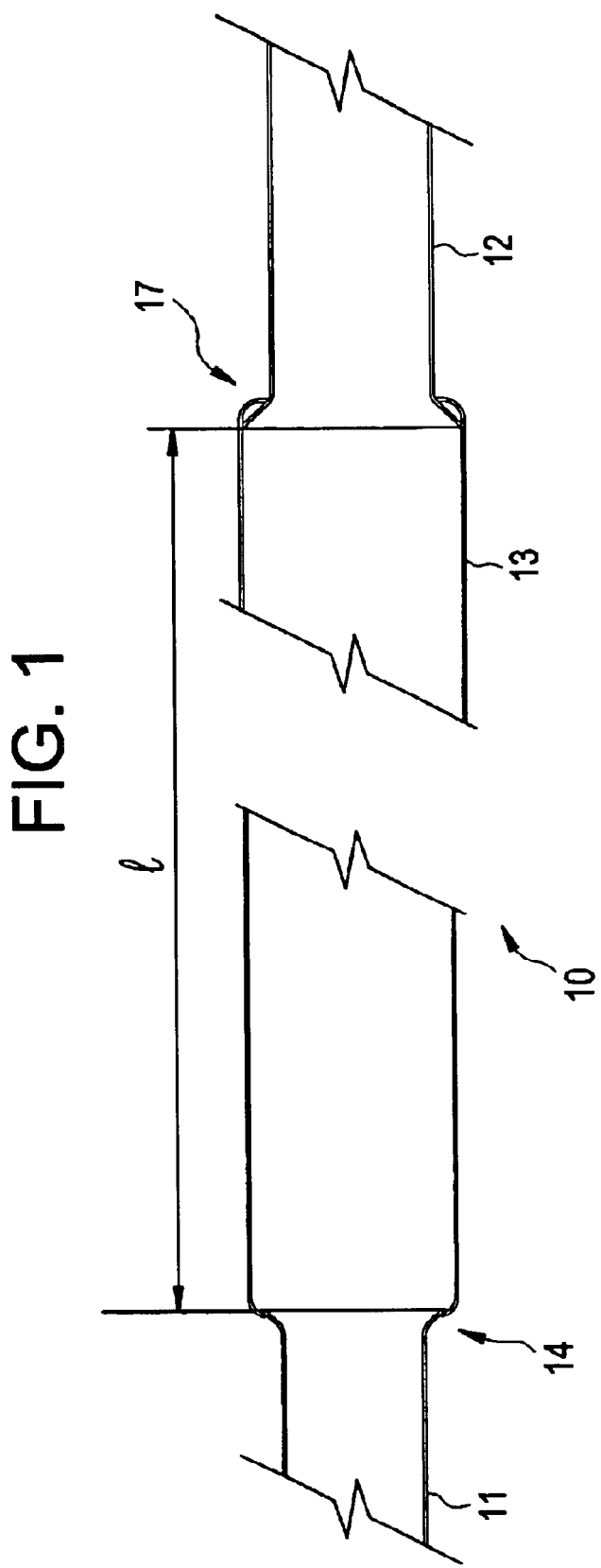
FIG. 1 shows a longitudinal sectional view of the unit of the invention.
Figure 2:
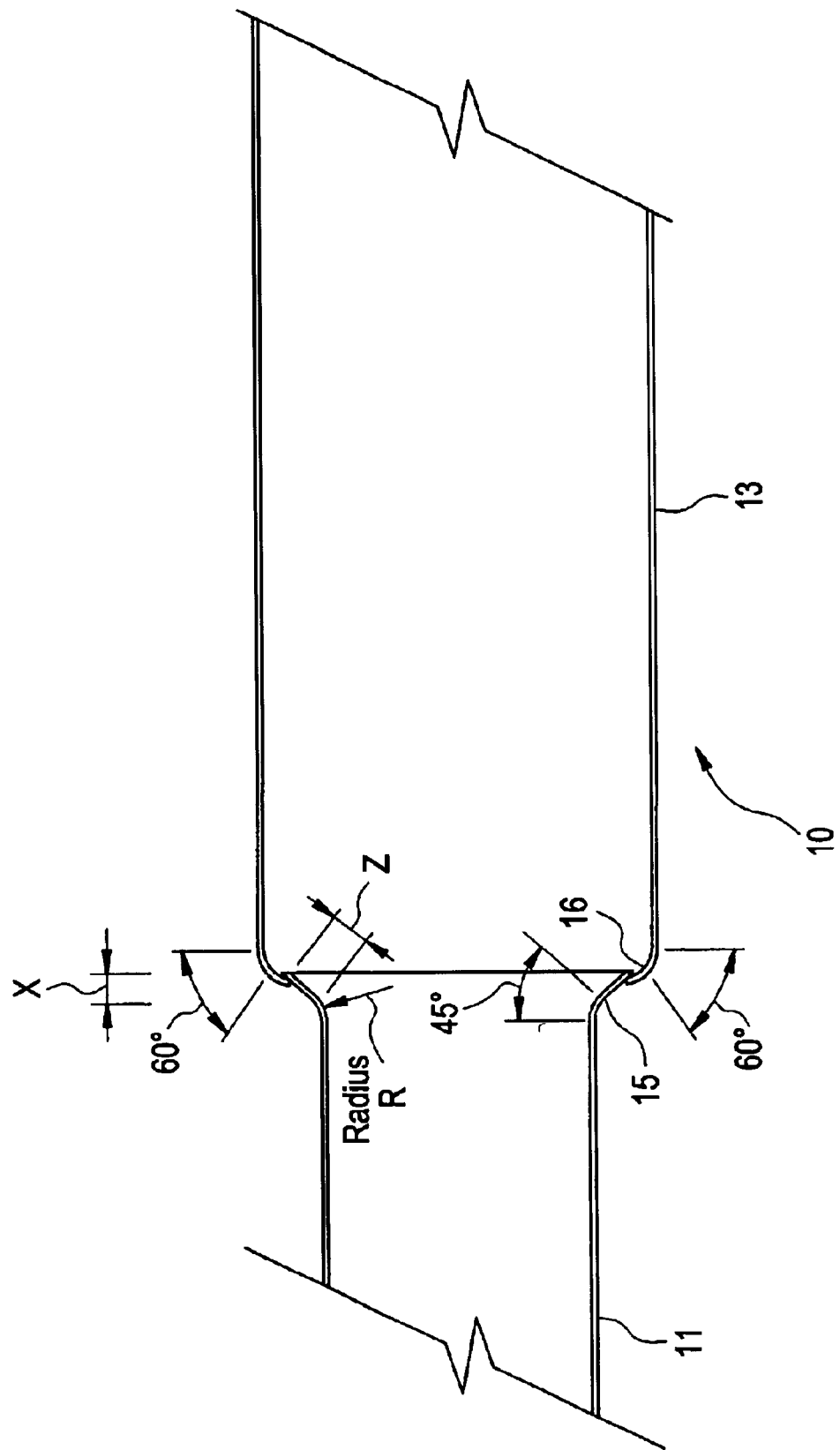
FIG. 2 shows a detailed view of the inlet end of the unit of FIG. 1.
Figure 3:
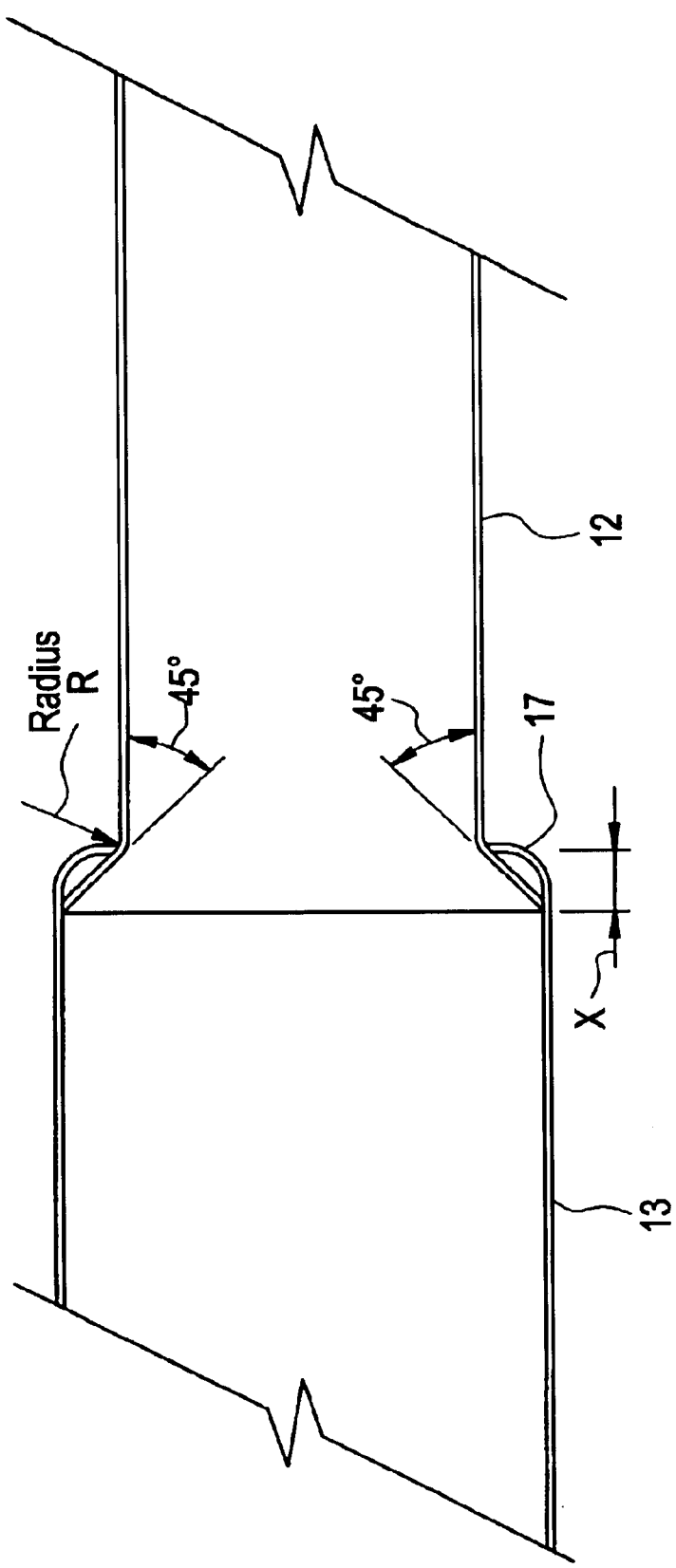
FIG. 3 shows a detailed view of the outlet end of the unit of FIG. 1.

FIGS. 1, 2 and 3 show an exhaust pulse control unit 10. The unit 10 has an inlet tube 11 and an outlet tube 12. Tube 12 is of a greater diameter than tube 11. Tube 11 is coupled to an engine and receives exhaust outlet pulses from the engine whilst tube 12 directs exhaust gases to an exhaust outlet at the end of an exhaust pipe.

The unit 10 has an intermediate zone 13 which extends between inlet and outlet tubes 11 and 12. An exhaust pulse capture and expansion zone 14 is located between the inlet tube 11 and the zone 13. The zone 14 has a first stage 15 which forms an angle of 45° relative to a longitudinal axis along the tube 11. Zone 14 has a second stage 16 immediately adjacent stage 15 and stage 16 forms an angle of 60° relative to the longitudinal axis of the tube 11. Stages 15 and 16 are responsible for the development of negative pressure through expansion and control of exhaust pulses and provides for more effective scavenging of gases from the engine to which the unit is fitted.

A merging zone 17 is located between tube 12 and zone 13. The zone 17 forms an angle of 45° with respect to a longitudinal axis along tube 12. Zone 17 is responsible for the merging of the outgoing exhaust is pressure pulse with the incoming atmospheric pulse. The length "l" of zone 13 is dependant on engine specifications.

The unit of the invention is responsible for creating an increase in power of the engine because it creates low pressure areas between exhaust pulses. The unit provides for efficient burning of fuel in the engine and better scavenging of exhaust gases from the engine.

The exhaust pulse control unit 10 creates negative pressure from positive pressure generated in an exhaust system of an internal combustion engine. The unit improves engine efficiency by improving engine scavenging.

A series of tests were conducted to illustrate improvements in engine operation of an engine fitting to a vehicle. One set of tests was conducted without the unit 10 of the invention fitted to the exhaust system of the engine and another set of identical tests was conducted with the unit 10 fitted to the engine of the vehicle. Apart from the addition of the unit of the invention the engine and vehicles in the tests were identical in all respects.

The tests were carried out on a computerised chassis dynamometer. Test parameters included atmospheric correction and cold air induction into the engine was compensated to 15° C. The vehicle was programmed to an acceleration rate of 50 feet per second per second full throttle. This allowed the vehicle to accelerate through a designated revolution per minute (RPM) range and plots of power and torque were taken during this program at 20 times per second.

A computerised power loss program was used to interpret torque readings and a display of tractive effort was obtained at constant acceleration.

The programmed RPM range covered is affected by the horsepower/torque difference.

The graph of FIG. 6 shows plots of power and torque of both test runs (one without a unit 10 and the other with a unit 10 of the invention) with the vehicle in $3^{rd}$ and $4^{th}$ gear over an RPM range of 2000 to 5000 RPM. The scale along the bottom of the graph denotes vehicle speed in kilometers per hour (kph), the scale along the left hand vertical side of the graph relates to power in kilowatts (kw) and the scale along the right hand side of the graph relates to torque or tractive effort in newtons (N).

The two traces commencing at about 68 kph and 3000N and extending substantially horizontally across the graph are plots of torque In $4^{th}$ gear starting at 2000 RPM and finishing at 5000 RPM with the upper plot of that pair of plots being with a unit 10 fitted whilst the lower plot of that pair is without a unit 10 fitted to the vehicle under test.

The two traces commencing at about 54 kph and 3700N and extending substantially horizontally across the graph are similar plots to the torque plots just described but with the vehicle being in $3^{rd}$ gear. The uppermost plot of these two traces is with a unit 10 fitted and the lowermost one is without a unit 10 fitted to the vehicle under test.

The power traces are also represented in two pairs. One pair of power traces with the vehicle in $3^{rd}$ gear start with the vehicle travelling at about 45 kph and extend at an inclined angle across the graph and terminate with the vehicle travelling at about 124 kph. The uppermost trace of this pair is with a unit 10 fitted and the lowermost trace of that pair is without a unit 10 fitted to the vehicle under test.

A similar pair of power plots are present for the test conducted in $4^{th}$ gear. These two traces commence with the vehicle travelling at about 68 kph and extend at an inclined angle across the graph and terminate with the vehicle travelling at about 166 kph. The uppermost trace of the pair is with a unit 10 fitted whilst the lowermost trace of the pair is without a unit 10 fitted to the vehicle under test.

The unit 10 of the invention achieves the following power and torque improvements over that achieved with a vehicle not fitted with such a unit.

Horsepower percentage increase in $3^{rd}$ gear 2.8% to 5.4% percentage increase in $4^{th}$ gear 3.0% to 9.7%

Tractive Effort (Torque)

percentage increase in $3^{rd}$ gear 2.6% to 4.6% percentage increase in $4^{th}$ gear 3.7% to 9.5%

Horsepower Output percentage increase from 3.9% to 38.3%

Torque Effort percentage increase from 3% to 13.5%

Highest achieved peak horsepower—seen as high as 125 kw at the wheels over a base line peak horsepower of 116.2 kw.

The following table summarises the results plotted in FIG. 6.

| Speed | $3^{rd}$ Gear | $4^{th}$ Gear |
| --- | --- | --- |
| 60 kph | 5.3% | |
| 70 kph | 5.0% | 8.3% |
| 80 kph | 5.4% | 9.7% |
| 90 kph | 2.8% | 6.9% |
| 100 kph | 3.8% | 6.1% |
| 110 kph | 3.0% | 4.0% |
| 120 kph | 3.9% | 4.7% |
| 130 kph | | 4.9% |
| 140 kph | | 4.2% |
| 150 kph | | 3.9% |
| 160 kph | | 4.8% |

Tractive Effort Increases are:

| Speed | $3^{rd}$ Gear | $4^{th}$ Gear |
| --- | --- | --- |
| 60 kph | 4.6% | |
| 70 kph | 4.6% | 8.3% |
| 80 kph | 4.5% | 9.5% |
| 90 kph | 2.6% | 5.6% |
| 100 kph | 2.7% | 5.9% |
| 110 kph | 2.7% | 4.4% |
| 120 kph | 3.6% | 3.7% |
| 130 kph | | 3.9% |
| 140 kph | | 4.0% |
| 150 kph | | 4.0% |
| 160 kph | | 4.6% |

Figure 4:
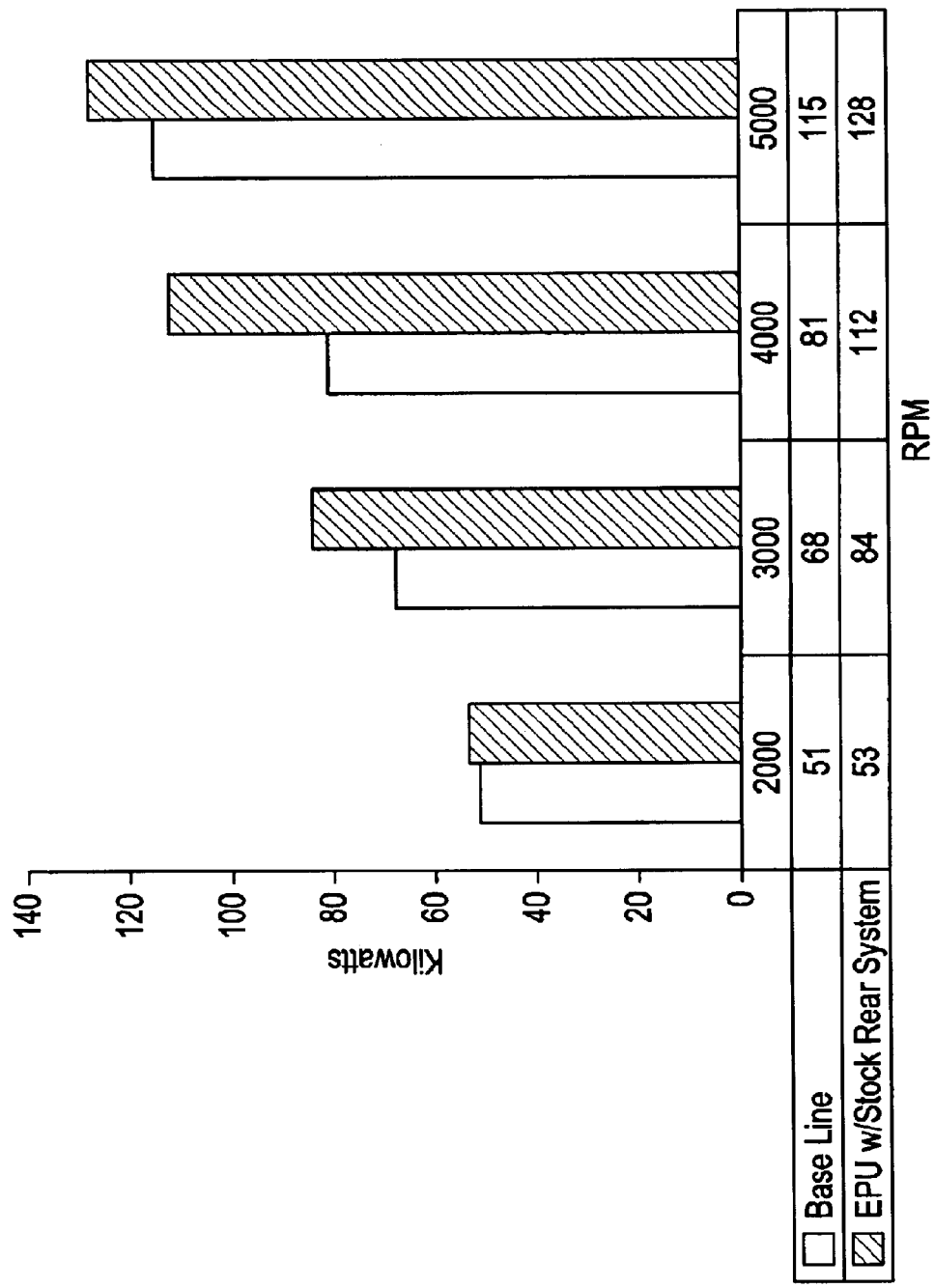
FIG. 4 is a graph of horsepower test results.
Figure 5:
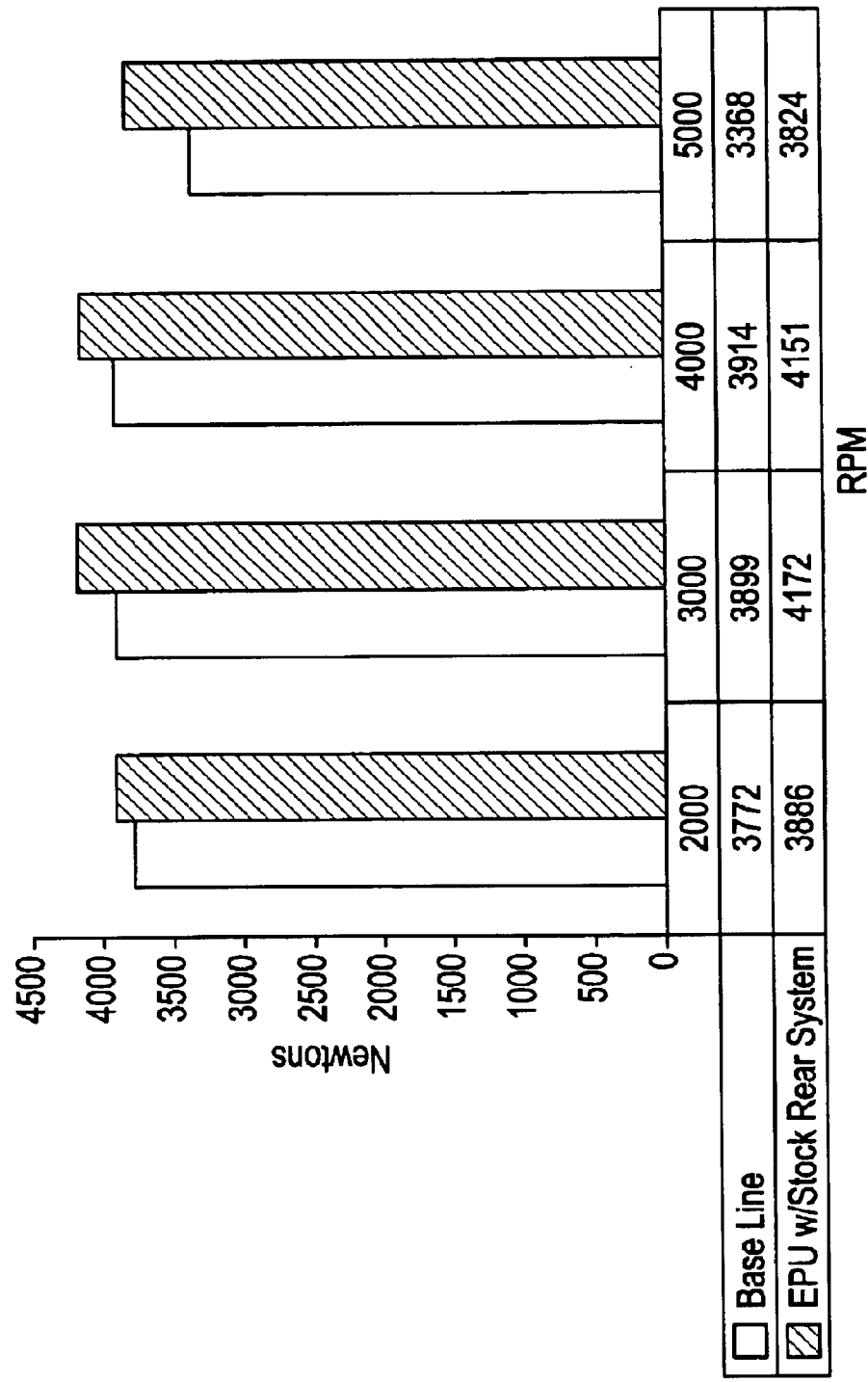
FIG. 5 is a graph of torque test results.

The power/torque output plots shown in FIGS. 4 and 5 were obtained employing the following test procedure.

The vehicle was installed into a fully computerised chassis dynamometer and test parameters were verified with atmospheric correction and cold air induction compensated to 15° C.

Power output was achieved by running the vehicle at set RPM lo levels, opening to full throttle whilst being held at that specific RPM. Power output/torque output was logged. The test was conducted at 2000, 3000, 4000 and 5000 RPM.

The plots of FIGS. 4 and 5 are representative of the results obtained. The term "base line" refers to the engine without unit 10 of the invention fitted whilst the legend "EPU w/stock rear system" refers to the same engine with a unit 10 of the invention fitted to it.

The following is a summary of the plots in FIGS. 4 and 5.

Average increase improvements.

| Horsepower Output | |
|---|---|
| @ 2000 RPM | 3.9% |
| @ 3000 RPM | 23.5% |
| @ 4000 RPM | 38.3% |
| @ 5000 RPM | 11.3% |
| Torque | |
| @ 2000 RPM | 3.0% |
| @ 3000 RPM | 7.3% |
| @ 4000 RPM | 6.1% |
| @ 5000 RPM | 13.5% |

The unit of the invention in addition to improvements in power and torque lead to more fuel efficient operation of the engine and reductions in harmful gas emissions.

What is claimed is:

1. An exhaust pulse control unit for creating negative pressure exhaust pulses upstream of the unit in a four stroke engine, the unit having a single chamber with an inlet, a separate exhaust pulse expansion and capture zone adjacent the inlet an intermediate containment zone with the expansion and capture zone being adjacent one end of the intermediate zone, an outlet adjacent the other end of the intermediate zone, the outlet having a greater diameter than the inlet and a merging zone between the intermediate zone and the outlet the expansion and capture zone consisting of a first stage and a second stage with the first stage providing a relatively rapid increase in exhaust gas volume and further expansion of the exhaust gas volume occurring in the second stage to thereby cause exhaust gas pulses to move along the intermediate zone, wherein an atmospheric return pulse interacts with an expanded exhaust pulse in the intermediate zone, without the presence of a muffling effect or muffling device in any of the zones and wherein the first stage extends at an angle to the longitudinal axis which is less than an angle to the longitudinal axis by the second stage.

2. The unit of claim 1 wherein the intermediate zone is of constant transverse cross sectional area for the whole of its length.

3. The unit of claim 1 wherein the inlet and the outlet are inlet and outlet tubes respectively.

4. The unit of claim 1 wherein the first stage forms an angle relative to a longitudinal axis through the unit that is less than an angle formed by the second stage.

5. The unit of claim 4 wherein the first stag forms an angle of between 40° to 50° relative to the longitudinal axis and the second stage forms an angle of between 60° to 80° relative to the longitudinal axis.

6. The unit of claim 5 wherein the first stage forms an angle of 45° to the longitudinal axis and the second stage forms an angle of 60° to the longitudinal axis.

7. The unit of claim 1 wherein the merging zone forms a angle of between 40° to 50° to a longitudinal axis through the outlet.

8. The unit of claim 7 wherein the merging zone forms a angle of 45° to the longitudinal axis through the outlet.

* * * * *